(No Model.)
T. WAITE.
PIPE COUPLING.
No. 587,347.  Patented Aug. 3, 1897.
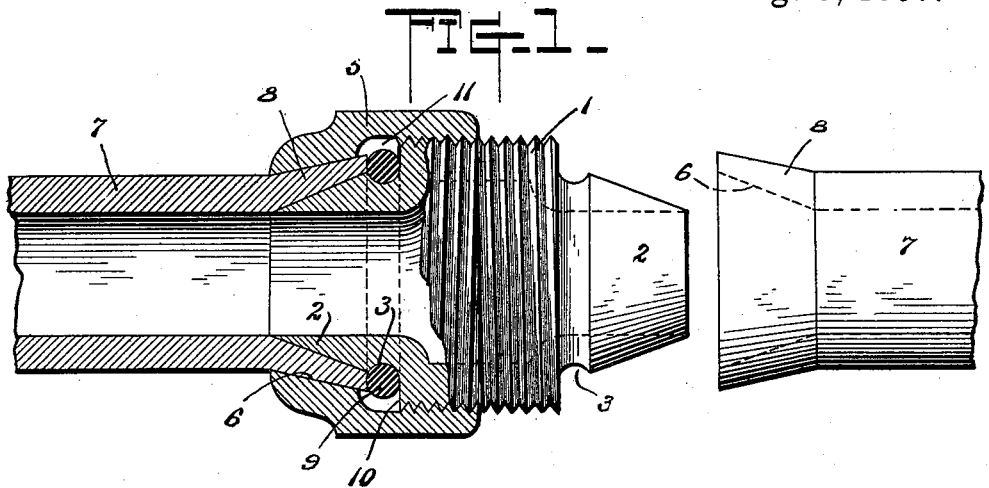
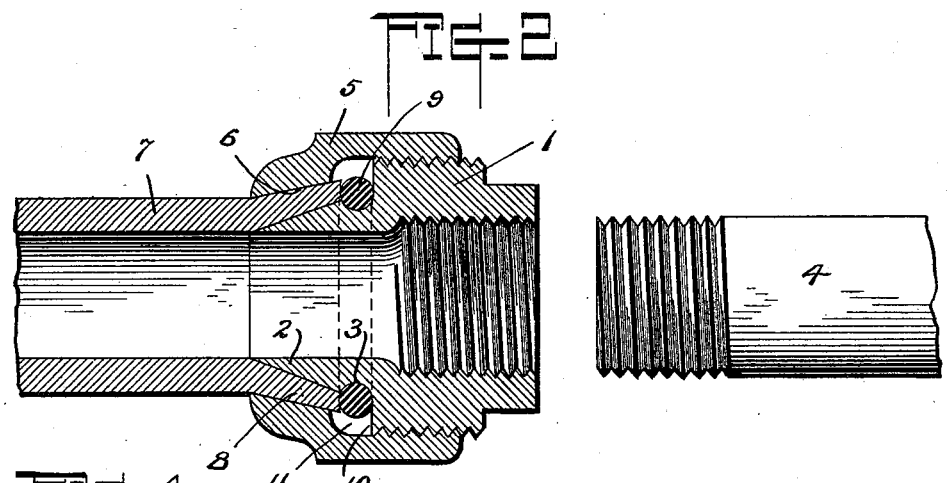
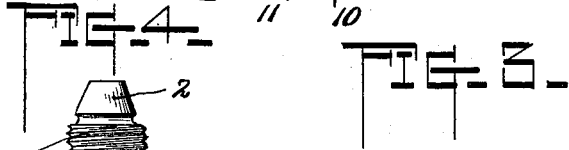
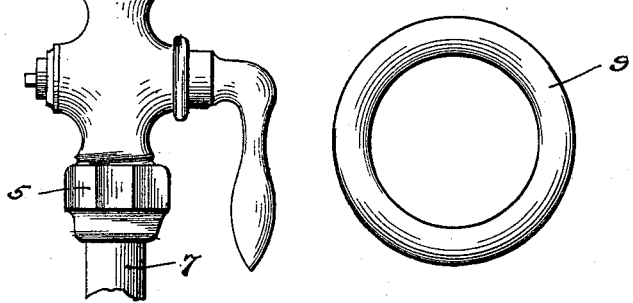
Witnesses
Inventor
Thomas Waite,
By his Attorneys.

UNITED STATES PATENT OFFICE.

THOMAS WAITE, OF CRAMER'S HILL, NEW JERSEY.

PIPE-COUPLING.

SPECIFICATION forming part of Letters Patent No. 587,347, dated August 3, 1897.

Application filed August 18, 1896. Serial No. 603,142. (No model.)

*To all whom it may concern:*

Be it known that I, THOMAS WAITE, a citizen of the United States, residing at Cramer's Hill, in the county of Camden and State of New Jersey, have invented a new and useful Pipe-Coupling, of which the following is a specification.

My invention relates to couplings particularly adapted for connecting lead pipes together or connecting a section of lead pipe to a contiguous section of iron pipe and also adapted for use in connection with traps, stop-cocks, hydrant and bath-room cocks, compression-bibs, and the equivalents thereof, the object in view being to provide a simple and efficient construction of coupling adapted to perform its function without the use of solder.

Further objects and advantages of this invention will appear in the following description, and the novel features thereof will be particularly pointed out in the appended claim.

In the drawings, Figure 1 is a sectional view of a coupling constructed in accordance with my invention adapted for connecting contiguous sections of lead pipes. Fig. 2 is a similar view showing the device constructed for connecting a section of lead pipe to a section of iron pipe. Fig. 3 is a detached view of the ring washer. Fig. 4 is a view showing the application of the coupling to a stop-cock.

Similar numerals of reference indicate corresponding parts in all the figures of the drawings.

The coupling embodying my invention consists, essentially, of a threaded body portion 1, provided with a terminal cone 2, between which and the body portion is arranged an annular depression or washer-seat 3, and when the device is adapted for use in connecting contiguous sections of lead pipe the above-named construction is duplicated, as shown in Fig. 1, with the body portion 1 provided with right and left threads.

Fig. 2 shows the device constructed for use in connecting a lead pipe with an iron pipe, in which case the only difference consists in providing the body portion at one end only with a cone, while the bore of the body portion is threaded to receive the contiguous threaded extremity of the iron pipe 4.

Arranged upon the body portion of the coupling is a clamping ring or nut 5, having a female cone 6, which is constructed approximately upon the same angle as the male cone 2, the interior or female cone being constructed upon a more gradual taper than the male cone, as clearly illustrated in Figs. 1 and 2.

The clamping ring or nut 5 is fitted upon the extremity of the lead pipe 7, which is terminally flared, as shown at 8, after which the male cone 2 is fitted in the end of the pipe subsequently to arranging an annular washer 9, of rubber or its equivalent, in the seat 3, thereby disposing said washer between the shoulder 10, formed by the extremity of the body portion, and the abutting end of the pipe 7, the clamping ring or nut being provided in the transverse plane of the washer with a counterbore or annular cavity 11 to provide for the spreading of the washer. When the clamping ring or nut is turned upon the body portion of the coupling to draw the pipe toward said body portion, and hence force the male cone firmly into the flared extremity of said pipe, it is obvious that said extremity of the pipe will be firmly clamped between the male and female cones, with its terminal in contact with the washer, thus insuring an air and water tight joint.

An important advantage of the construction above described resides in its simplicity and the facility with which the same may be connected to the contiguous extremities of pipe-sections without the use of solder or other forms of cement which are ordinarily employed in pipe-fitting. Furthermore, in case of leakage after long use the clamping ring or nut may be readily unscrewed from the body portion of the coupling and a new washer introduced without disarranging any of the parts, and particularly without necessitating more than a very slight longitudinal movement of the pipe. The removal of the clamping ring or nut exposes the washer-seat.

Various changes in the form, proportion, and the minor details of construction may be resorted to without departing from the spirit or sacrificing any of the advantages of this invention.

In Fig. 4 I have shown the application of my improved coupling device to a stop-cock, from which it will be seen that the body portion of the coupling is cast integral with the stop-cock casing, thus simplifying the apparatus and at the same time attaining all of the advantages of the invention.

Having described my invention, what I claim is—

A pipe-coupling having an exteriorly-threaded body portion provided with a terminal exterior or male cone adapted to fit in the flared extremity of the pipe-section, and also having an annular transversely-concaved washer-seat at the intersection of said cone and the threaded body portion, and contiguous to a shoulder formed by the extremity of the body portion, an annular washer arranged between the extremity of the pipe-section and the contiguous shoulder formed by the body portion, and a clamping ring or nut mounted upon said body portion and provided with a female cone adapted to engage the exterior surface of the flared extremity of the pipe-section, and also provided with an annular counterbore in the plane of the washer to allow radial expansion thereof, whereby as the extremity of the pipe-section bears against the washer, the latter is spread to cover the end of the pipe-section, substantially as specified.

In testimony that I claim the foregoing as my own I have hereto affixed my signature in the presence of two witnesses.

THOMAS WAITE.

Witnesses:
    THOS. SANCTUARY,
    SUSIE SANCTUARY.